United States Patent
Wu

(10) Patent No.: US 12,213,160 B2
(45) Date of Patent: Jan. 28, 2025

(54) RESOURCE ALLOCATION METHOD, TERMINAL DEVICE, AND NETWORK-SIDE DEVICE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 744 days.

(21) Appl. No.: 17/236,652

(22) Filed: Apr. 21, 2021

(65) Prior Publication Data
US 2021/0243764 A1    Aug. 5, 2021

Related U.S. Application Data

(63) Continuation of application No. PCT/CN2019/108892, filed on Sep. 29, 2019.

(30) Foreign Application Priority Data

Oct. 31, 2018    (CN) .......................... 201811287710.1

(51) Int. Cl.
H04W 72/53    (2023.01)
H04L 5/00    (2006.01)
H04W 72/21    (2023.01)

(52) U.S. Cl.
CPC ........... *H04W 72/53* (2023.01); *H04L 5/0048* (2013.01); *H04W 72/21* (2023.01)

(58) Field of Classification Search
CPC ..... H04W 72/53; H04W 72/21; H04W 72/23; H04W 76/11; H04W 76/15; H04W 80/02;
(Continued)

(56) References Cited

U.S. PATENT DOCUMENTS

2015/0341921 A1    11/2015    Chen et al.
2018/0098250 A1*    4/2018    Vrzic ................ H04W 36/18
(Continued)

FOREIGN PATENT DOCUMENTS

CN    107241164 A    10/2017
CN    107342851 A    11/2017
(Continued)

OTHER PUBLICATIONS

Japanese Office Action related to Application No. 2021521975 reported on May 23, 2022.
(Continued)

*Primary Examiner* — Charles C Jiang
*Assistant Examiner* — Shawn D Miller
(74) *Attorney, Agent, or Firm* — von Briesen & Roper, s.c.

(57) ABSTRACT

This disclosure provides a resource allocation method, a terminal device, and a network-side device. The method includes: receiving uplink resource allocation rule information configured for a path of a bearer of a terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and performing uplink resource allocation based on the uplink resource allocation rule information.

20 Claims, 5 Drawing Sheets

---

Receive uplink resource allocation rule information configured by a network-side device for a path of a bearer of a terminal device — 601

Perform uplink resource allocation based on the uplink resource allocation rule information — 602

(58) Field of Classification Search
CPC ... H04L 5/0048; H04L 5/0037; H04L 5/0094; H04B 7/0639
See application file for complete search history.

(56) References Cited

U.S. PATENT DOCUMENTS

| | | | | |
|---|---|---|---|---|
| 2018/0368200 | A1* | 12/2018 | Jin | H04L 1/189 |
| 2019/0098533 | A1* | 3/2019 | Babaei | H04L 1/08 |
| 2020/0119864 | A1* | 4/2020 | Xu | H04L 1/1858 |
| 2020/0245330 | A1 | 7/2020 | Jiang | |
| 2021/0152296 | A1 | 5/2021 | Chen | |

FOREIGN PATENT DOCUMENTS

| | | |
|---|---|---|
| CN | 108353408 A | 7/2018 |
| JP | 2017516420 A | 6/2017 |
| WO | 2018059557 A1 | 4/2018 |

OTHER PUBLICATIONS

R2-1704835, Source: Huawei, HiSilicon; "Dynamic activation/deactivation of packet duplication", Document for: Discussion and Decision, Agenda item: 10.2.2, Release: 3GPP TSG-RAN2 #98, Hangzhou, China, May 15-19, 2017.

R2-1801760 resubmission of R2-1800067, Source: OPPO; "SCell (de-)activation with duplication operation", Document for: Discussion, Decision, Agenda Item: 10.3.1.13, Release: 3GPP TSG-RAN2 #101, Athens, Greece, Feb. 26-Mar. 2, 2018.

R2-1816941, Source: Vivo; "Consideration on multi-leg PDCP duplication". Document for: Discussion and Decision, Agenda item: 11.7.4, Release: 3GPP Tsg-Ran WG2 Meeting #104, Spokane, USA, Nov. 12-16, 2018.

R2-1817107, Source: Vivo; "NR V2X scenario for PDCP duplication supporting", Document for: Discussion and Decision, Agenda item: 11.4.2.1, Release: 3GPP TSG-RAN WG2 Meeting #104, Spokane, USA, Nov. 12-16, 2018.

Extended European Search Report related to Application No. 19880798.4; reported on Dec. 6, 2021.

Qualcomm Incorporated; "Impact of PDCP duplication on LCP", 3GPP TSG-RAN WG2 Meeting #101, Athens, Greece, Feb. 26-Mar. 2, 2018, R2-1803117.

International Search Report and Written Opinion related to PCT/CN2019/108892 reported on May 14, 2021.

R2-1706716; Configration and Control of Packet Duplication; 3GPP TSG RAN WG2 NR Ad Hoc; Qingdao, China; Jun. 27-29, 2017.

* cited by examiner

RESOURCE ALLOCATION METHOD, TERMINAL DEVICE, AND NETWORK-SIDE DEVICE

CROSS-REFERENCE TO RELATED APPLICATIONS

This application is a continuation application of International Application No. PCT/CN2019/108892 filed on Sep. 29, 2019, which claims priority to Chinese Patent Application No. 201811287710.1, filed in China on Oct. 31, 2018, which is incorporated herein by reference in its entirety.

TECHNICAL FIELD

This disclosure relates to the field of communications technologies, and in particular, to a resource allocation method, a terminal device, and a network-side device.

BACKGROUND

With development of communications technologies, a network-side device can configure one or at least two paths for a data duplication function of the packet data convergence protocol (PDCP for short) used for a radio bearer (RB for short) of a terminal device. The network-side device can choose to deactivate one or more of the paths. For example, when one PDCP entity corresponds to three radio link control (RLC for short) entities, one of the paths can be deactivated. In this case, the deactivated path is not used for data reception or transmission, but the PDCP duplication function can still be used through an activated path, that is, the terminal device can transmit data through the activated path. However, in the related art, there is no relevant solution on how to perform resource allocation for a path configured for a bearer of the terminal device.

SUMMARY

According to a first aspect, an embodiment of this disclosure provides a resource allocation method, applied to a terminal device, where the method includes:
  receiving uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and
  performing uplink resource allocation based on the uplink resource allocation rule information.

According to a second aspect, an embodiment of this disclosure further provides a resource allocation method, applied to a network-side device, where the method includes:
  transmitting, to a terminal device, uplink resource allocation rule information configured for a path of a bearer of the terminal device, where
  the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

According to a third aspect, an embodiment of this disclosure further provides a terminal device. The terminal device includes:
  a receiving module, configured to receive uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and
  an allocation module, configured to perform uplink resource allocation based on the uplink resource allocation rule information.

According to a fourth aspect, an embodiment of this disclosure further provides a network-side device. The network-side device includes:
  a transmitting module, configured to transmit, to a terminal device, uplink resource allocation rule information configured for a path of a bearer of the terminal device, where
  the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

According to a fifth aspect, an embodiment of this disclosure further provides a terminal device, including a processor, a memory, and a computer program stored in the memory and capable of running on the processor, where when the computer program is executed by the processor, the steps of the resource allocation method according to the first aspect are implemented.

According to a sixth aspect, an embodiment of this disclosure further provides a network-side device, including a processor, a memory, and a computer program stored in the memory and capable of running on the processor, where when the computer program is executed by the processor, the steps of the resource allocation method according to the second aspect are implemented.

According to a seventh aspect, an embodiment of this disclosure further provides a computer-readable storage medium, where the computer-readable storage medium stores a computer program, and when the computer program is executed by a processor, the steps of the resource allocation method according to the first aspect are implemented, or the steps of the resource allocation method according to the second aspect are implemented.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art can derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this disclosure are used to distinguish between similar objects instead of describing a specific order or sequence. It should be understood that the data termed in such a manner are interchangeable in proper cases so that the embodiments of this disclosure can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of description, the following describes some terms involved in the embodiments of this disclosure:

Packet data convergence protocol (PDCP for short) duplication (that is, PDCP Duplication) transmission:

The network side device can configure whether the PDCP layer of a radio bearer (RB) of the terminal device (which may be also referred to as user equipment, UE for short) transmits, after data of a PDCP entity is duplicated, the duplicated data through at least two different paths, such as two different radio link control (RLC) entities, for transmission. Different RLC entities correspond to different logical channels.

It should be noted that the PDCP data duplication function can indicate whether it is to be started (that is, activated) or stopped (that is, deactivated) through media access control layer control signaling (MAC CE). Optionally, when configuring the PDCP data duplication function of the RB, the network-side device can configure whether the PDCP data duplication function is enabled immediately upon configuration, that is, no MAC CE signaling is required for additional activation.

Figure 1:
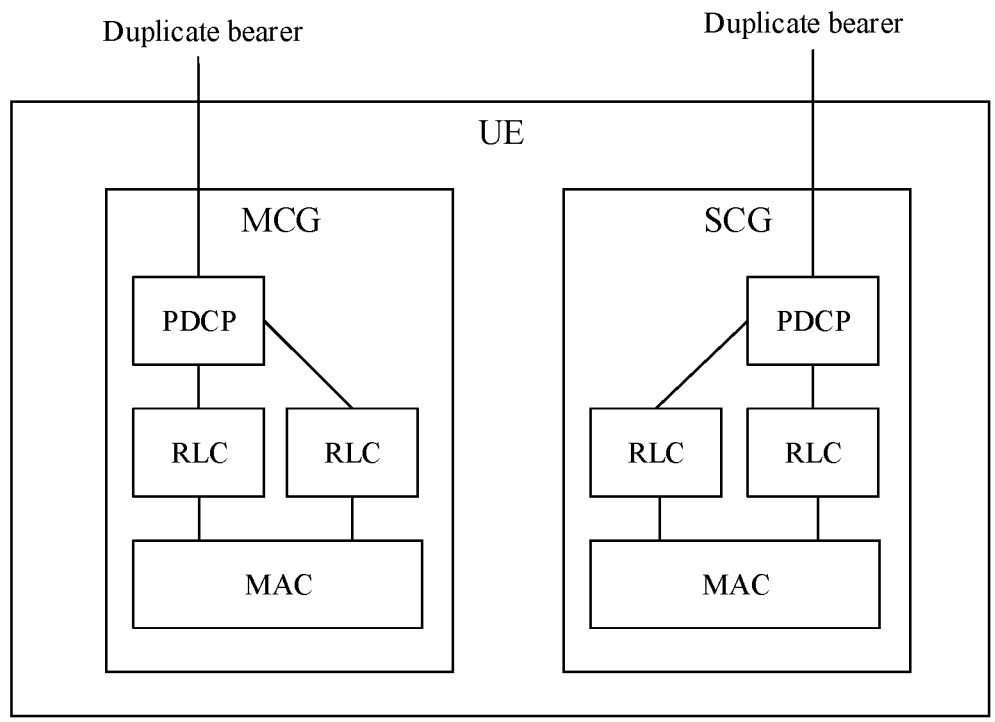
FIG. 1 is a schematic diagram of a duplicate bearer according to an embodiment of this disclosure.
Figure 2:
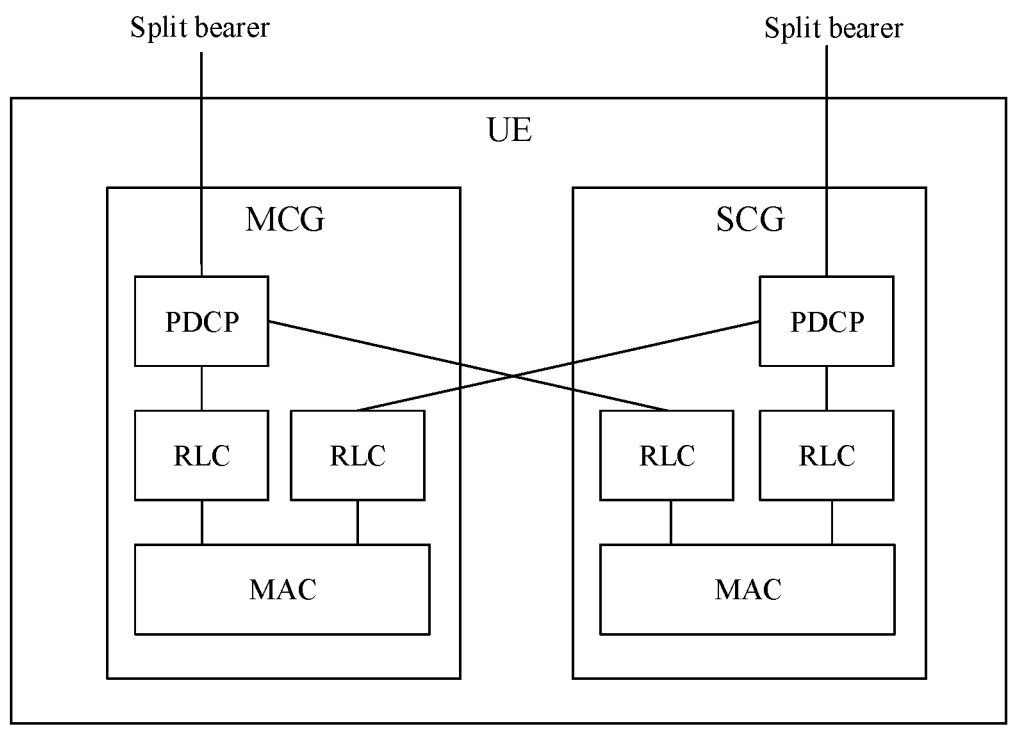
FIG. 2 is a schematic diagram of a split bearer according to an embodiment of this disclosure.

Bearer types of the PDCP data duplication function:

In a future mobile communications system (for example, the fifth generation (5G for short) system), due to the dual connectivity (DC) architecture which includes two cell groups, namely a master cell group (MCG) and a secondary cell group (SCG), the PDCP data duplication function includes two bearer types shown in FIG. 1 and FIG. 2:

Duplicate bearer: One PDCP entity, at least two RLC entities (two RLC entities are used as an example in FIG. 1), and one MAC entity that correspond to the bearer are in one cell group.

Split bearer: A PDCP entity corresponding to the bearer is in one cell group, and at least two RLC entities (two RLC entities are used as an example in FIG. 2) and at least two MAC entities that correspond to the bearer are in a different cell group.

Figure 3:
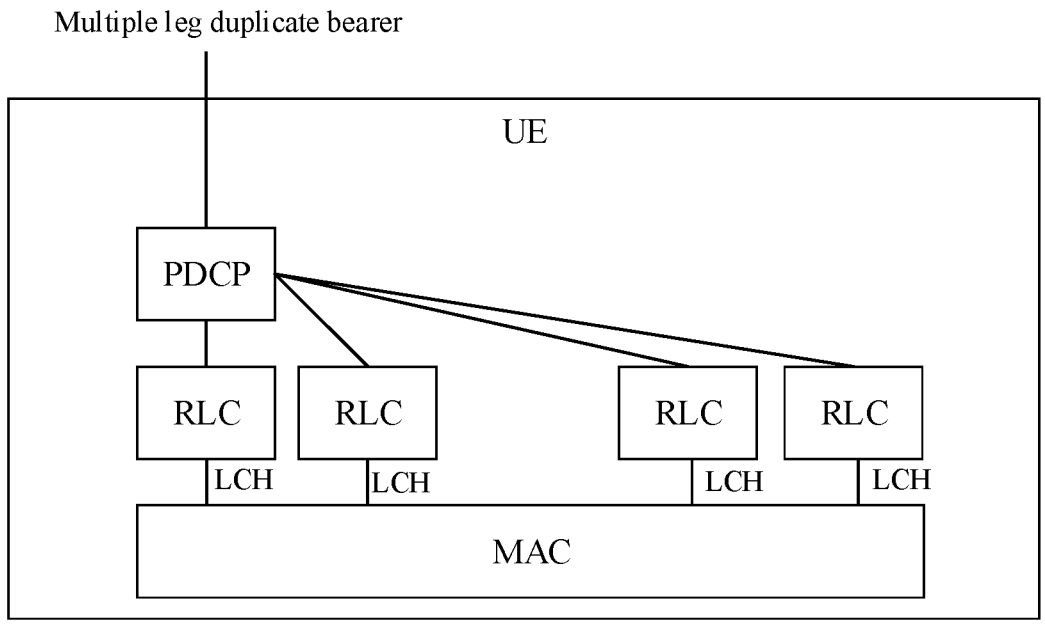
FIG. 3 is a schematic diagram of a multiple leg duplicate bearer according to an embodiment of this disclosure.
Figure 4:
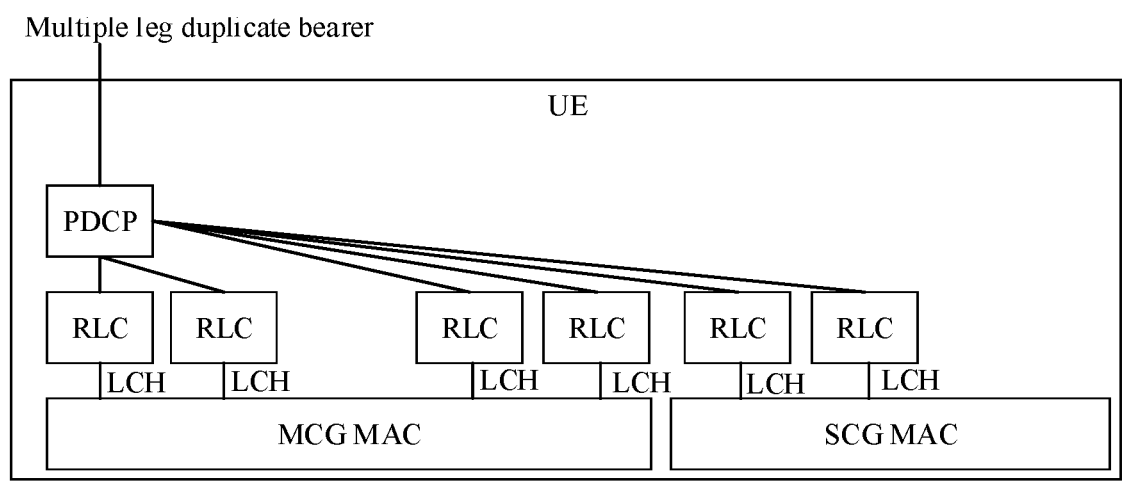
FIG. 4 is a schematic diagram of another multiple leg duplicate bearer according to an embodiment of this disclosure.

Multiple path PDCP data duplication (that is, Multiple Leg PDCP Duplication):

As shown in FIG. 3 and FIG. 4, the PDCP data duplication function can be configured with more than two paths. For example, one PDCP entity can correspond to three RLC entities. The network-side device can choose to deactivate one or more of the paths, for example, one of the three configured paths. In this case, the deactivated path is not used for data reception or transmission, but the PDCP duplication function can still be used through an activated path, that is, the terminal device can transmit data through the activated path.

Figure 5:
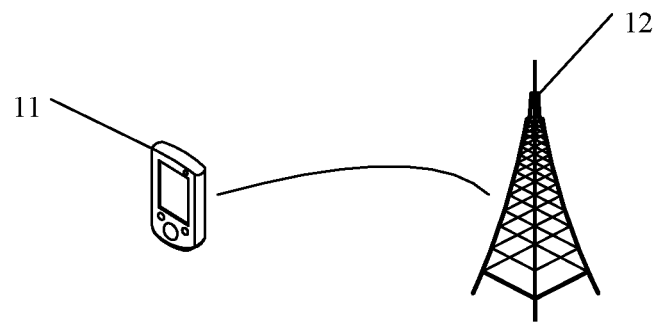
FIG. 5 is a structural diagram of a network system applicable to an embodiment of this disclosure.

An embodiment of this disclosure provides a resource allocation method. FIG. 5 is a structural diagram of a network system applicable to an embodiment of this disclosure. As shown in FIG. 5, the network system includes a terminal device 11 and a network-side device 12. The terminal device 11 may be a terminal device-side device such as a mobile phone, a tablet computer (Tablet Personal Computer), a laptop computer, a personal digital assistant (PDA for short), a mobile Internet device (MID), or a wearable device. It should be noted that a specific type of the terminal device 11 is not limited in the embodiments of this disclosure. The network-side device 12 may be a base station, for example, a macro base station, an LTE eNB, a 5G NR NB, or a gNB. The network-side device 12 may alternatively be a small cell, for example, a low power node (LPN), a pico cell, or a femto cell, or the network-side device 12 may be an access point (AP). The base station may alternatively be a network node formed by a central unit (CU) and a plurality of transmission reception points (TRP) managed and controlled by the central unit. It should be noted that a specific type of the network-side device 12 is not limited in the embodiments of this disclosure.

In this embodiment of this disclosure, the network-side device 12 can configure uplink resource allocation rule information for one or at least two paths of a bearer of the terminal device 11. The uplink resource allocation rule information may include a first uplink resource allocation rule and/or a second uplink resource allocation rule, the first uplink resource allocation rule may be an uplink resource allocation rule used when the path is in an activated state, and the second uplink resource allocation rule may be an uplink resource allocation rule used when the path is in a deactivated state.

The bearer may include but is not limited to signaling radio bearer (SRB) or data radio bearer (DRB). The path may include but is not limited to an RLC entity or a logical channel.

Optionally, when the network-side device 12 configures only one path for the bearer of the terminal device 11, the first uplink resource allocation rule and/or the second uplink resource allocation rule can be configured for the path; and when the network-side device 12 configures at least two paths for the bearer of the terminal device 11, the first uplink resource allocation rule and/or the second uplink resource allocation rule can be configured for each of the two paths.

It should be noted that the first uplink resource allocation rule configured for different paths of the at least two paths may be the same or different; and the second uplink resource allocation rule configured for different paths of the at least two paths may be the same or different.

After receiving the uplink resource allocation rule information, the terminal device 11 can perform uplink resource allocation based on the uplink resource allocation rule information. For example, when the path is in the activated state, the first uplink resource allocation rule is used to allocate an uplink resource for the path; and when the path is in the deactivated state, the second uplink resource allocation rule is used to allocate an uplink resource for the path.

In the resource allocation method according to this embodiment of this disclosure, because the first uplink resource allocation rule and the second uplink resource allocation rule are resource allocation rules respectively configured for different states of a path, resources can be allocated flexibly for the path of the bearer of the terminal device by receiving the first uplink resource allocation rule and/or the second uplink resource allocation rule configured by the network-side device for the path of the bearer of the terminal device, and using an uplink resource allocation rule corresponding to a state of the path for uplink resource allocation, thereby improving the reliability of service data transmission.

Figure 6:
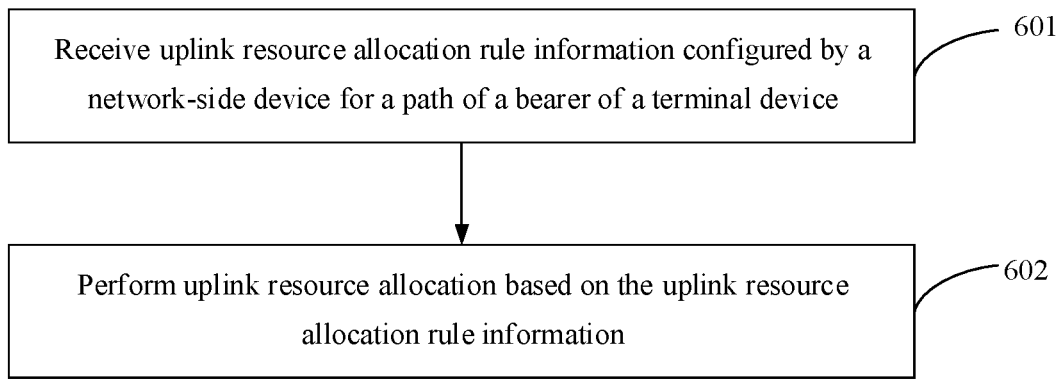
FIG. 6 is a flowchart of a resource allocation method according to an embodiment of this disclosure.

An embodiment of this disclosure provides a resource allocation method, and the method is applied to a terminal device. FIG. 6 is a flowchart of a resource allocation method according to an embodiment of this disclosure. As shown in FIG. 6, the method includes the following steps.

Step 601. Receive uplink resource allocation rule information configured by a network-side device for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

In this embodiment of this disclosure, the bearer may include but is not limited to an SRB or a DRB, and the path may include but is not limited to an RLC entity or a logical channel. The uplink resource may include but is not limited to an uplink grant.

There may be one or at least two paths of the bearer of the terminal device. For example, referring to FIG. 3, one PDCP entity corresponds to four RLC entities, each RLC entity corresponds to one logical channel (LCH for short), and the four paths correspond to a same media access control (MAC) entity.

In practical applications, when the network-side device configures only one path for the bearer of the terminal device, the first uplink resource allocation rule and/or the second uplink resource allocation rule can be configured for the path; and when the network-side device configures at least two paths for the bearer of the terminal device, the first uplink resource allocation rule and/or the second uplink resource allocation rule can be configured for each of the two paths.

It should be noted that the first uplink resource allocation rule configured for different paths of the at least two paths may be the same or different; and the second uplink resource allocation rule configured for different paths of the at least two paths may be the same or different.

Step 602. Perform uplink resource allocation based on the uplink resource allocation rule information.

In this step, after receiving the uplink resource allocation rule information, the terminal device can perform uplink resource allocation based on the uplink resource allocation rule information. For example, when the path is in the activated state, the first uplink resource allocation rule corresponding to the path can be used to allocate an uplink resource for the path; and when the path is in the deactivated state, the second uplink resource allocation rule corresponding to the path can be used to allocate an uplink resource for the path.

In the resource allocation method according to this embodiment of this disclosure, because the first uplink resource allocation rule and the second uplink resource allocation rule are resource allocation rules respectively configured for different states of a path, resources can be allocated flexibly for the path of the bearer of the terminal device by receiving the first uplink resource allocation rule and/or the second uplink resource allocation rule configured by the network-side device for the path of the bearer of the terminal device, and using an uplink resource allocation rule corresponding to a state of the path for uplink resource allocation, thereby improving the reliability of service data transmission.

Optionally, the bearer includes at least two paths.

The foregoing step 602 of performing uplink resource allocation based on the uplink resource allocation rule information includes:

allocating, by a media access control MAC entity of the terminal device based on uplink resource allocation rule information corresponding to a target path, an uplink resource for the target path, where the target path is a path of the at least two paths which corresponds to the MAC entity.

In practical applications, the path of the bearer of the terminal device can correspond to the same MAC entity. As shown in FIG. 3, one PDCP entity corresponds to four RLC entities, and the four RLC entities correspond to a same MAC entity. The path of the bearer of the terminal device can alternatively correspond to different MAC entities. As shown in FIG. 4, one PDCP entity corresponds to six RLC entities, where four RLC entities correspond to an MCG MAC entity, and two RLC entities correspond to an SCG MAC entity.

In this embodiment of this disclosure, the MAC entity of the terminal device can allocate resources only for its corresponding path in the process of performing uplink resource allocation. For example, the MCG MAC entity allocates uplink resources for its corresponding four RLC entities, and the SCG MAC entity allocates uplink resources for its corresponding two RLC entities.

In this embodiment of this disclosure, the MAC entity of the terminal device allocates an uplink resource for a target path based on the uplink resource allocation rule information corresponding to the target path, thereby increasing the flexibility and accuracy of uplink resource allocation.

Optionally, when the uplink resource allocation rule information includes the first uplink resource allocation rule and the second uplink resource allocation rule, the foregoing step 602 of performing uplink resource allocation based on the uplink resource allocation rule information includes:

allocating an uplink resource for the path by using the first uplink resource allocation rule when the path is in the activated state; and allocating an uplink resource for the path by using the second uplink resource allocation rule when the path is in the deactivated state.

In this embodiment of this disclosure, if there is one path of the bearer of the terminal device, when the path is in the activated state, the first uplink resource allocation rule can be used to allocate an uplink resource for the path; and when the path is in the deactivated state, the second uplink resource allocation rule can be used to allocate an uplink resource for the path.

If there are at least two paths of the bearer of the terminal device, when a first path is in the activated state, the first uplink resource allocation rule corresponding to the first path can be used to allocate an uplink resource for the first path; and when the first path is in the deactivated state, the second uplink resource allocation rule corresponding to the first path can be used to allocate an uplink resource for the first path, where the first path is any one of the at least two paths.

In this embodiment of this disclosure, a first uplink resource allocation rule and a second uplink resource allocation rule are configured for a path of a bearer of the terminal device. When the path is in the activated state, the first uplink resource allocation rule is used to allocate an uplink resource for the path; and when the path is in the deactivated state, the second uplink resource allocation rule is used to allocate an uplink resource for the path. Because different uplink resource allocation rules are used for uplink resource allocation when the path of the bearer of the terminal device is in different states, the flexibility and accuracy of resource allocation for the path of the bearer of the terminal device can be increased, thereby improving the reliability of service data transmission.

Optionally, the first uplink resource allocation rule includes at least one of the following:

type information of a first available uplink resource; and type information of a first unavailable uplink resource;

and/or, the second uplink resource allocation rule includes at least one of the following:

type information of a second available uplink resource; and type information of a second unavailable uplink resource.

In this embodiment of this disclosure, the type information of the first available uplink resource is the type information of the uplink resource available when the path is in the activated state. For example, for an uplink grant of this type, the path (for example, a logical channel) is included at the time when the UE allocates the uplink grant based on the logical channel priority (LCP). The type information of the first unavailable uplink resource is the type information of the uplink resource unavailable when the path is in the activated state. For example, for an uplink grant of this type, the path is not included at the time when the UE allocates the uplink grant based on the LCP.

The type information of the second available uplink resource is the type information of the uplink resource available when the path is in the deactivated state. For example, for an uplink grant of this type, the path (for example, a logical channel) is included at the time when the UE allocates the uplink grant based on the LCP. The type information of the second unavailable uplink resource is the type information of the uplink resource unavailable when the path is in the deactivated state. For example, for an uplink grant of this type, the path is not included at the time when the UE allocates the uplink grant based on the LCP.

In this embodiment of this disclosure, the network-side device allocates type information of the available uplink resource and/or type information of the unavailable uplink resource for different states of the path, so that the resource allocation for the path of the bearer of the terminal device is more flexible.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;

and/or, the type information of the first available uplink resource and/or the type information of the second available uplink resource includes information used to indicate any uplink resource available;

and/or, the type information of the first unavailable uplink resource and/or the type information of the second unavailable uplink resource includes information used to indicate any uplink resource unavailable.

In this embodiment of this disclosure, the type information of the uplink resource may include at least one of the type information of the first available uplink resource, the type information of the second available uplink resource, the type information of the first unavailable uplink resource, and the type information of the second unavailable uplink resource.

Specifically, the type information of the first available uplink resource may include at least one of a sub-carrier spacing (SCS for short) corresponding to the uplink resource; a carrier corresponding to the uplink resource; a bandwidth part (BWP for short) corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource available.

The type information of the first unavailable uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource unavailable.

The type information of the second available uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource available.

The type information of the second unavailable uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource unavailable.

The uplink resource may include but is not limited to an uplink grant. The value of the sub-carrier spacing corresponding to the uplink resource can be properly configured based on an actual need, for example, the SCS is equal to 15 KHz. The value of the carrier corresponding to the uplink resource can also be properly configured based on an actual need, for example, serving cell 1 or serving cell 2. The value of the bandwidth part corresponding to the uplink resource can also be properly configured based on an actual need, for example, BWP_1 or BWP_3. The duration of the transmission channel corresponding to the uplink resource can also be properly configured based on an actual need, for example, a time length of a physical uplink shared channel (Physical Uplink Sharing Channel, PUSCH) is one slot. The value of the grant type corresponding to the uplink resource can also be properly configured based on an actual need, for example, configured grant 1, configured grant 2, or autonomous uplink (AUL).

It should be noted that the value of each item included in any one of the type information of the first available uplink resource, the type information of the first unavailable uplink resource, the type information of the second available uplink resource, and the type information of the second unavailable uplink resource can be properly configured based on an actual situation.

For example, the type information of the first available uplink resource includes an SCS corresponding to the uplink resource, a carrier corresponding to the uplink resource, and a BWP corresponding to the uplink resource, where the value of the SCS corresponding to the uplink resource is 15 KHz, the carrier corresponding to the uplink resource is serving cell 1, and the BWP corresponding to the uplink resource is BWP_2. The type information of the first unavailable uplink resource includes a carrier corresponding to the uplink resource and a BWP corresponding to the uplink resource, where the carrier corresponding to the uplink resource is serving cell 2, and the BWP corresponding to the uplink resource is BWP_1. The type information of the second available uplink resource includes a carrier corresponding to the uplink resource and a grant type corresponding to the uplink resource, where the carrier corresponding to the uplink resource is serving cell 3, and the grant type corresponding to the uplink resource is configured grant 1. The type information of the second unavailable uplink resource includes a carrier corresponding to the uplink resource and a BWP corresponding to the uplink resource, where the carrier corresponding to the uplink resource is serving cell 3, and the BWP corresponding to the uplink resource is BWP_1.

It should be noted that when the type information of the first available uplink resource and/or the type information of the second available uplink resource corresponding to a specific path includes information used to indicate any uplink resource available, the path is included when the terminal device performs allocation of any type of uplink resources. When the type information of the first unavailable uplink resource and/or the type information of the second unavailable uplink resource corresponding to a specific path includes information used to indicate any uplink resource unavailable, the path is not included when the terminal device performs allocation of any type of uplink resources.

In addition, optionally, the priority of the information used to indicate any uplink resource available may be higher than the priorities of the type information of other available uplink resources (for example, an SCS corresponding to the uplink resource, a carrier corresponding to the uplink resource, a BWP corresponding to the uplink resource, and beam information corresponding to the uplink resource), and the priority of the information used to indicate any uplink resource unavailable may be higher than the priorities of the type information of other unavailable uplink resources. To be specific, when the information used to indicate any uplink resource available or the information used to indicate any uplink resource unavailable is configured, the uplink resource allocation may be preferentially performed based on the information used to indicate any uplink resource available or the information used to indicate any uplink resource unavailable.

Optionally, in the embodiments of this disclosure, when the information used to indicate any uplink resource available is configured, it is not allowed to configure the type information of other available uplink resources, and/or when the information used to indicate any uplink resource unavailable is configured, it is not allowed to configure the type information of other unavailable uplink resources, to avoid conflicts between configuration information.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

In this embodiment of this disclosure, the value of each item included in the beam information and the value of each item included in the transmission node information can be properly configured based on an actual situation. The beam information is used as an example. For example, the value of the cell identifier corresponding to the beam may be cell 1, the value of the frequency point identifier corresponding to the beam is frequency 1, the value of the BWP corresponding to the beam is BWP_1, and the value of the MAC entity identifier corresponding to the beam is MAC_1.

Optionally, the beam identifier and/or the transmission node identifier includes at least one of the following:
- a synchronization signal block SSB identifier;
- a channel state information reference signal CSI-RS identifier;
- a reference signal identifier other than the CSI-RS identifier; and
- a port identifier corresponding to a reference signal.

In this embodiment of this disclosure, the beam identifier may include at least one of a synchronous signal block (SSB for short) identifier, a channel state information reference signal (CSI-RS for short) identifier, a reference signal identifier other than the CSI-RS identifier, and a port identifier corresponding to a reference signal.

The transmission node identifier may include at least one of an SSB identifier, a CSI-RS identifier, a reference signal identifier other than the CSI-RS identifier, and a port identifier corresponding to a reference signal.

It should be noted that the value of each item included in the beam identifier and the value of each item included in the transmission node identifier can be properly configured based on an actual situation.

Optionally, the control channel identifier corresponding to a beam and/or the control channel identifier corresponding to a transmission node includes at least one of the following:
- a control channel type identifier;
- a resource location identifier of a control channel;
- a reference signal identifier of a control channel; and
- a port identifier corresponding to a reference signal of a control channel.

In this embodiment of this disclosure, the control channel identifier corresponding to the beam may include at least one of a control channel type identifier, a resource location identifier of a control channel, a reference signal identifier of a control channel, and a port identifier corresponding to a reference signal of a control channel.

The control channel identifier corresponding to the transmission node may include at least one of a control channel type identifier, a resource location identifier of a control channel, a reference signal identifier of a control channel, and a port identifier corresponding to a reference signal of a control channel.

The control channel type identifier may include but is not limited to a physical downlink control channel (PDCCH) identifier of a primary cell (PCell), and the like. The resource location identifier of the control channel may include but is not limited to a control resource set (CORESET) identifier, and/or a search space identifier, and the like. The reference signal identifier of the control channel may include but is not limited to an SSB identifier and/or a CSI-RS identifier, and the like.

It should be noted that the value of each item included in the control channel identifier corresponding to the beam and the value of each item included in the control channel identifier corresponding to the transmission node can be properly configured based on an actual situation.

Figure 7:
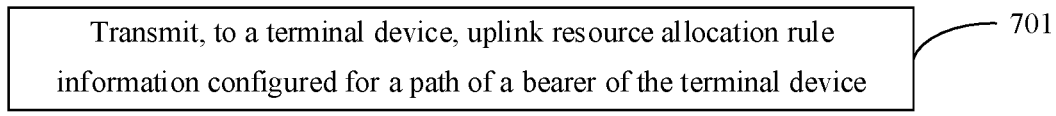
FIG. 7 is a flowchart of another resource allocation method according to an embodiment of this disclosure.

An embodiment of this disclosure further provides a resource allocation method, and the method is applied to a network-side device. FIG. 7 is a flowchart of another resource allocation method according to an embodiment of this disclosure. As shown in FIG. 7, the method includes the following steps.

Step 701. Transmit, to a terminal device, uplink resource allocation rule information configured for a path of a bearer of the terminal device, where
the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

In this embodiment of this disclosure, the bearer may include but is not limited to an SRB or a DRB, and the path may include but is not limited to an RLC entity or a logical channel. The uplink resource may include but is not limited to an uplink grant.

There may be one or at least two paths of the bearer of the terminal device. For example, referring to FIG. 3, one PDCP entity corresponds to four RLC entities, each RLC entity corresponds to one logical channel (LCH for short), and the four paths correspond to a same media access control (MAC) entity.

In practical applications, when the network-side device configures only one path for the bearer of the terminal device, the first uplink resource allocation rule and/or the second uplink resource allocation rule can be configured for the path; and when the network-side device configures at least two paths for the bearer of the terminal device, the first uplink resource allocation rule and/or the second uplink resource allocation rule can be configured for each of the two paths.

It should be noted that the first uplink resource allocation rule configured for different paths of the at least two paths may be the same or different; and the second uplink resource allocation rule configured for different paths of the at least two paths may be the same or different.

In this embodiment of this disclosure, the network-side device configures and transmits to the terminal device the first uplink resource allocation rule and/or the second uplink resource allocation rule for the path of the bearer of the terminal device. Because the first uplink resource allocation rule and the second uplink resource allocation rule are resource allocation rules respectively configured for different states of a path, the terminal device can use an uplink resource allocation rule corresponding to a state of the path for uplink resource allocation.

Optionally, the first uplink resource allocation rule includes at least one of the following:
- type information of a first available uplink resource; and
- type information of a first unavailable uplink resource;

and/or,
the second uplink resource allocation rule includes at least one of the following:
- type information of a second available uplink resource; and
- type information of a second unavailable uplink resource.

In this embodiment of this disclosure, the type information of the first available uplink resource is the type information of the uplink resource available when the path is in the activated state. For example, for an uplink grant of this type, the path (for example, a logical channel) is included at the time when the UE allocates the uplink grant based on the LCP. The type information of the first unavailable uplink resource is the type information of the uplink resource unavailable when the path is in the activated state. For example, for an uplink grant of this type, the path is not included at the time when the UE allocates the uplink grant based on the LCP.

The type information of the second available uplink resource is the type information of the uplink resource available when the path is in the deactivated state. For example, for an uplink grant of this type, the path (for example, a logical channel) is included at the time when the UE allocates the uplink grant based on the LCP. The type information of the second unavailable uplink resource is the type information of the uplink resource unavailable when the path is in the deactivated state. For example, for an uplink grant of this type, the path is not included at the time when the UE allocates the uplink grant based on the LCP.

In this embodiment of this disclosure, the network-side device allocates type information of the available uplink resource and/or type information of the unavailable uplink resource for different states of the path, so that the resource allocation for the path of the bearer of the terminal device is more flexible.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;

and/or, the type information of the first available uplink resource and/or the type information of the second available uplink resource includes information used to indicate any uplink resource available;

and/or, the type information of the first unavailable uplink resource and/or the type information of the second unavailable uplink resource includes information used to indicate any uplink resource unavailable.

In this embodiment of this disclosure, the type information of the uplink resource may include at least one of the type information of the first available uplink resource, the type information of the second available uplink resource, the type information of the first unavailable uplink resource, and the type information of the second unavailable uplink resource.

Specifically, the type information of the first available uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource available.

The type information of the first unavailable uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource unavailable.

The type information of the second available uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource available.

The type information of the second unavailable uplink resource may include at least one of a sub-carrier spacing corresponding to the uplink resource; a carrier corresponding to the uplink resource; a bandwidth part corresponding to the uplink resource; beam information corresponding to the uplink resource; transmission node information corresponding to the uplink resource; duration of a transmission channel corresponding to the uplink resource; grant type corresponding to the uplink resource; and information used to indicate any uplink resource unavailable.

The uplink resource may include but is not limited to an uplink grant. The value of the sub-carrier spacing corresponding to the uplink resource can be properly configured based on an actual need, for example, the SCS is equal to 15 KHz. The value of the carrier corresponding to the uplink resource can also be properly configured based on an actual need, for example, serving cell 1 or serving cell 2. The value of the bandwidth part corresponding to the uplink resource can also be properly configured based on an actual need, for example, BWP_1 or BWP_3. The duration of the transmission channel corresponding to the uplink resource can also be properly configured based on an actual need, for example, a time length of a PUSCH is one slot. The value of the grant type corresponding to the uplink resource can also be properly configured based on an actual need, for example, configured grant 1, configured grant 2, or AUL.

It should be noted that the value of each item included in any one of the type information of the first available uplink resource, the type information of the first unavailable uplink resource, the type information of the second available uplink resource, and the type information of the second unavailable uplink resource can be properly configured based on an actual situation.

For example, the type information of the first available uplink resource includes an SCS corresponding to the uplink resource, a carrier corresponding to the uplink resource, and a BWP corresponding to the uplink resource, where the value of the SCS corresponding to the uplink resource is 15 KHz, the carrier corresponding to the uplink resource is serving cell 1, and the BWP corresponding to the uplink resource is BWP_2. The type information of the first unavailable uplink resource includes a carrier corresponding to the uplink resource and a BWP corresponding to the uplink resource, where the carrier corresponding to the uplink resource is serving cell 2, and the BWP corresponding to the uplink resource is BWP_1. The type information of the second available uplink resource includes a carrier corresponding to the uplink resource and a grant type corresponding to the uplink resource, where the carrier corresponding to the uplink resource is serving cell 3, and the grant type corresponding to the uplink resource is configured grant 1. The type information of the second unavailable uplink resource includes a carrier corresponding to the uplink resource and a BWP corresponding to the uplink resource, where the carrier corresponding to the uplink resource is serving cell 3, and the BWP corresponding to the uplink resource is BWP_1.

It should be noted that when the type information of the first available uplink resource and/or the type information of the second available uplink resource corresponding to a specific path includes information used to indicate any uplink resource available, the path is included when the terminal device performs allocation of any type of uplink resources. When the type information of the first unavailable uplink resource and/or the type information of the second unavailable uplink resource corresponding to a specific path includes information used to indicate any uplink resource unavailable, the path is not included when the terminal device performs allocation of any type of uplink resources.

In addition, optionally, the priority of the information used to indicate any uplink resource available may be higher than the priorities of the type information of other available uplink resources (for example, an SCS corresponding to the uplink resource, a carrier corresponding to the uplink resource, a BWP corresponding to the uplink resource, and beam information corresponding to the uplink resource), and the priority of the information used to indicate any uplink resource unavailable may be higher than the priorities of the type information of other unavailable uplink resources. To be specific, when the information used to indicate any uplink resource available or the information used to indicate any uplink resource unavailable is configured, the uplink resource allocation may be preferentially performed based on the information used to indicate any uplink resource available or the information used to indicate any uplink resource unavailable.

Optionally, in the embodiments of this disclosure, when the information used to indicate any uplink resource available is configured, it is not allowed to configure the type information of other available uplink resources, and/or when the information used to indicate any uplink resource unavailable is configured, it is not allowed to configure the type information of other unavailable uplink resources, to avoid conflicts between configuration information.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

In this embodiment of this disclosure, the value of each item included in the beam information and the value of each item included in the transmission node information can be properly configured based on an actual situation. The beam information is used as an example. For example, the value of the cell identifier corresponding to the beam may be cell 1, the value of the frequency point identifier corresponding to the beam is frequency 1, the value of the BWP corresponding to the beam is BWP_1, and the value of the MAC entity identifier corresponding to the beam is MAC_1.

Optionally, the beam identifier and/or the transmission node identifier includes at least one of the following:

a synchronization signal block SSB identifier;
a channel state information reference signal CSI-RS identifier;
a reference signal identifier other than the CSI-RS identifier; and
a port identifier corresponding to a reference signal.

In this embodiment of this disclosure, the beam identifier may include at least one of an SSB, a CSI-RS identifier, a reference signal identifier other than the CSI-RS identifier, and a port identifier corresponding to a reference signal.

The transmission node identifier may include at least one of an SSB identifier, a CSI-RS identifier, a reference signal identifier other than the CSI-RS identifier, and a port identifier corresponding to a reference signal.

It should be noted that the value of each item included in the beam identifier and the value of each item included in the transmission node identifier can be properly configured based on an actual situation.

Optionally, the control channel identifier corresponding to a beam and/or the control channel identifier corresponding to a transmission node includes at least one of the following:

a control channel type identifier;
a resource location identifier of a control channel;
a reference signal identifier of a control channel; and
a port identifier corresponding to a reference signal of a control channel.

In this embodiment of this disclosure, the control channel identifier corresponding to the beam may include at least one of a control channel type identifier, a resource location identifier of a control channel, a reference signal identifier of a control channel, and a port identifier corresponding to a reference signal of a control channel.

The control channel identifier corresponding to the transmission node may include at least one of a control channel type identifier, a resource location identifier of a control channel, a reference signal identifier of a control channel, and a port identifier corresponding to a reference signal of a control channel.

The control channel type identifier may include but is not limited to a PDCCH identifier of a PCell, and the like. The resource location identifier of the control channel may include but is not limited to a CORESET identifier, and/or a search space identifier, and the like. The reference signal identifier of the control channel may include but is not limited to an SSB identifier and/or a CSI-RS identifier, and the like.

It should be noted that the value of each item included in the control channel identifier corresponding to the beam and the value of each item included in the control channel identifier corresponding to the transmission node can be properly configured based on an actual situation.

The following describes embodiments of this disclosure with reference to FIG. 3 and FIG. 4.

Example 1: All Paths of One Bearer Correspond to the Same MAC Entity, as Shown in FIG. 3

Specifically, the resource allocation method in this embodiment of this disclosure may include the following steps:

Step a1. The network-side device configures a plurality of available paths for transmission or reception for a bearer of a terminal device.

For example, as shown in FIG. 3, one PDCP entity corresponds to four RLC entities, each RLC entity corresponds to one logical channel, and the four paths correspond to a same MAC entity.

Step a2. The network-side device configures uplink resource allocation rule information for one or at least two paths of the bearer of the terminal device.

It should be noted that, reference may be made to the foregoing description for the uplink resource allocation rule information. Details are not described herein again.

It should be noted that configuration information of the step a1 and step a2 may be transmitted through one or different pieces of signaling, which is not limited in this embodiment of this disclosure.

Step a3. After the terminal device receives an uplink grant, when performing resource allocation based on the uplink grant (for example, performing LCP process), the MAC entity of the terminal device performs uplink grant allocation based on the uplink resource allocation rule information configured in step a2.

In this step, for a path (for example, a logical channel) in the activated state, the MAC entity may perform the uplink grant allocation by using the first uplink resource allocation rule; and for a path (for example, a logical channel) in the deactivated state, the MAC entity may perform the uplink grant allocation by using the second uplink resource allocation rule.

For example, if the uplink grant is an uplink grant for the path (for example, a logical channel) that is available, the path is included when the MAC entity performs uplink grant allocation (for example, performing LCP process). If the uplink grant is an uplink grant for the path that is unavailable, the logical channel is not included when the MAC entity performs uplink grant allocation.

Example 2: Paths of One Bearer Correspond to Different MAC Entities, as Shown in FIG. 4

Specifically, the resource allocation method in this embodiment of this disclosure may include the following steps:

Step b1. The network-side device configures a plurality of available paths for transmission or reception for a bearer of a terminal device.

For example, as shown in FIG. 4, one PDCP entity corresponds to six RLC entities, and each RLC entity corresponds to one logical channel, where four paths correspond to an MCG MAC entity, and two paths correspond to an SCG MAC entity.

Step b2. The network-side device configures uplink resource allocation rule information for one or at least two paths of the bearer of the terminal device.

It should be noted that, reference may be made to the foregoing description for the uplink resource allocation rule information. Details are not described herein again.

It should be noted that configuration information of the step b1 and step b2 may be transmitted through one or different pieces of signaling, which is not limited in this embodiment of this disclosure.

Step b3. After the terminal device receives an uplink grant, when performing resource allocation based on the uplink grant (for example, performing LCP process), the MCG MAC entity or the SCG MAC entity of the terminal device performs uplink grant allocation based on the uplink resource allocation rule information configured in step b2.

In this step, for a path (for example, a logical channel) in the activated state, the MCG MAC entity or the SCG MAC entity may perform the uplink grant allocation by using the first uplink resource allocation rule; and for a path (for example, a logical channel) in the deactivated state, the MCG MAC entity or the SCG MAC entity may perform the uplink grant allocation by using the second uplink resource allocation rule.

For example, if the uplink grant is an uplink grant for the path (for example, a logical channel) that is available, the path is included when the MCG MAC entity or the SCG MAC entity performs uplink grant allocation (for example, performing LCP process). If the uplink grant is an uplink grant for the path that is unavailable, the logical channel is not included when the MCG MAC entity or the SCG MAC entity performs uplink grant allocation.

It should be noted that when performing uplink grant allocation, the MCG MAC entity or the SCG MAC entity of the terminal device only allocates the uplink grant to its corresponding path(s). For example, as shown in FIG. 4, the MCG MAC entity only allocates its received uplink grant to its corresponding four paths, and the SCG MAC entity only allocates its received uplink grant to its corresponding two paths.

By using the resource allocation method according to this embodiment of this disclosure, the network-side device can control resource allocation for different activated paths, thereby configuring resource allocation rules more flexibly, and improving the reliability of service data transmission.

Figure 8:
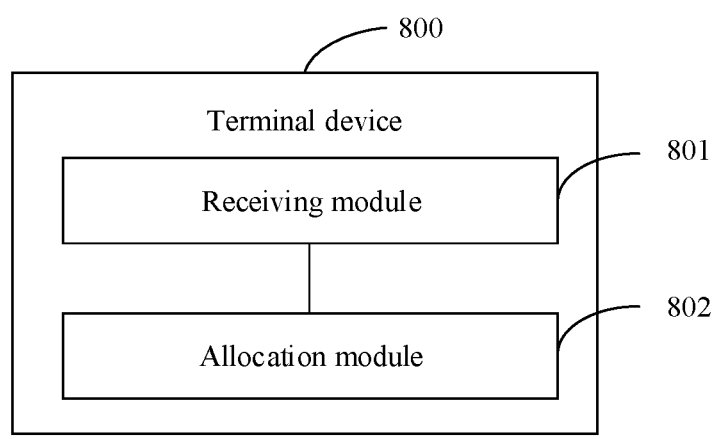
FIG. 8 is a structural diagram of a terminal device according to an embodiment of this disclosure.

FIG. 8 is a structural diagram of a terminal device according to an embodiment of this disclosure. As shown in FIG. 8, the terminal device 800 includes a receiving module 801 and an allocation module 802.

The receiving module 801 is configured to receive uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

The allocation module 802 is configured to perform uplink resource allocation based on the uplink resource allocation rule information.

Optionally, the bearer includes at least two paths.

The allocation module is specifically configured to:
allocate, by a media access control MAC entity of the terminal device based on uplink resource allocation rule information corresponding to a target path, an uplink resource for the target path, where
the target path is a path of the at least two paths which corresponds to the MAC entity.

Optionally, the allocation module is specifically configured to:
when the uplink resource allocation rule information includes the first uplink resource allocation rule and the second uplink resource allocation rule, allocate an uplink resource for the path by using the first uplink resource allocation rule when the path is in the activated state; and allocate an uplink resource for the path by using the second uplink resource allocation rule when the path is in the deactivated state.

Optionally, the first uplink resource allocation rule includes at least one of the following:
type information of a first available uplink resource; and
type information of a first unavailable uplink resource;
and/or,
the second uplink resource allocation rule includes at least one of the following:
type information of a second available uplink resource; and
type information of a second unavailable uplink resource.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;

and/or, the type information of the first available uplink resource and/or the type information of the second available uplink resource includes information used to indicate any uplink resource available;

and/or, the type information of the first unavailable uplink resource and/or the type information of the second unavailable uplink resource includes information used to indicate any uplink resource unavailable.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

Optionally, the beam identifier and/or the transmission node identifier includes at least one of the following:

a synchronization signal block SSB identifier;

a channel state information reference signal CSI-RS identifier;

a reference signal identifier other than the CSI-RS identifier; and a port identifier corresponding to a reference signal.

Optionally, the control channel identifier corresponding to a beam and/or the control channel identifier corresponding to a transmission node includes at least one of the following:

a control channel type identifier;

a resource location identifier of a control channel;

a reference signal identifier of a control channel; and a port identifier corresponding to a reference signal of a control channel.

The terminal device 800 provided in this embodiment of this disclosure is capable of implementing various processes implemented by the terminal device in the method embodiments of FIG. 6 to FIG. 7. To avoid repetition, details are not described herein again.

In the terminal device 800 according to this embodiment of this disclosure, the receiving module 801 is configured to receive uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and the allocation module 802 is configured to perform uplink resource allocation based on the uplink resource allocation rule information. Because the first uplink resource allocation rule and the second uplink resource allocation rule are resource allocation rules respectively configured for different states of a path, resources can be allocated flexibly for a path of a bearer of the terminal device when an uplink resource allocation rule corresponding to a state of the path is used for uplink resource allocation, thereby improving the reliability of service data transmission.

Figure 9:
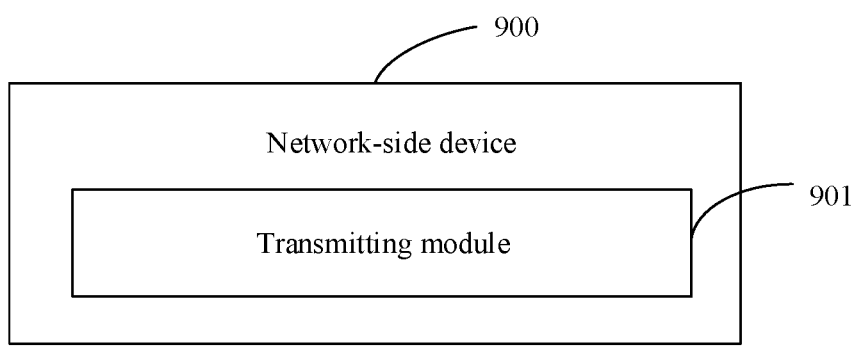
FIG. 9 is a structural diagram of a network-side device according to an embodiment of this disclosure.

FIG. 9 is a structural diagram of a network-side device according to an embodiment of this disclosure. As shown in FIG. 9, the network-side device 900 includes a transmitting module 901.

The transmitting module 901 is configured to transmit, to a terminal device, uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

Optionally, the first uplink resource allocation rule includes at least one of the following:

type information of a first available uplink resource; and type information of a first unavailable uplink resource;

and/or, the second uplink resource allocation rule includes at least one of the following:

type information of a second available uplink resource; and type information of a second unavailable uplink resource.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;

and/or, the type information of the first available uplink resource and/or the type information of the second available uplink resource includes information used to indicate any uplink resource available;

and/or, the type information of the first unavailable uplink resource and/or the type information of the second unavailable uplink resource includes information used to indicate any uplink resource unavailable.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

Optionally, the beam identifier and/or the transmission node identifier includes at least one of the following:

a synchronization signal block SSB identifier;
a channel state information reference signal CSI-RS identifier;
a reference signal identifier other than the CSI-RS identifier; and
a port identifier corresponding to a reference signal.

Optionally, the control channel identifier corresponding to a beam and/or the control channel identifier corresponding to a transmission node includes at least one of the following:
a control channel type identifier;
a resource location identifier of a control channel;
a reference signal identifier of a control channel; and
a port identifier corresponding to a reference signal of a control channel.

The network-side device 900 provided in this embodiment of this disclosure is capable of implementing various processes implemented by the network-side device in the method embodiments of FIG. 6 to FIG. 7. To avoid repetition, details are not described herein again.

In the network-side device 900 according to this embodiment of this disclosure, the transmitting module 901 is configured to transmit, to a terminal device, uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state. Because the first uplink resource allocation rule and the second uplink resource allocation rule are resource allocation rules respectively configured for different states of a path, the terminal device can perform uplink resource allocation by using an uplink resource allocation rule corresponding to a state of the path.

Figure 10:
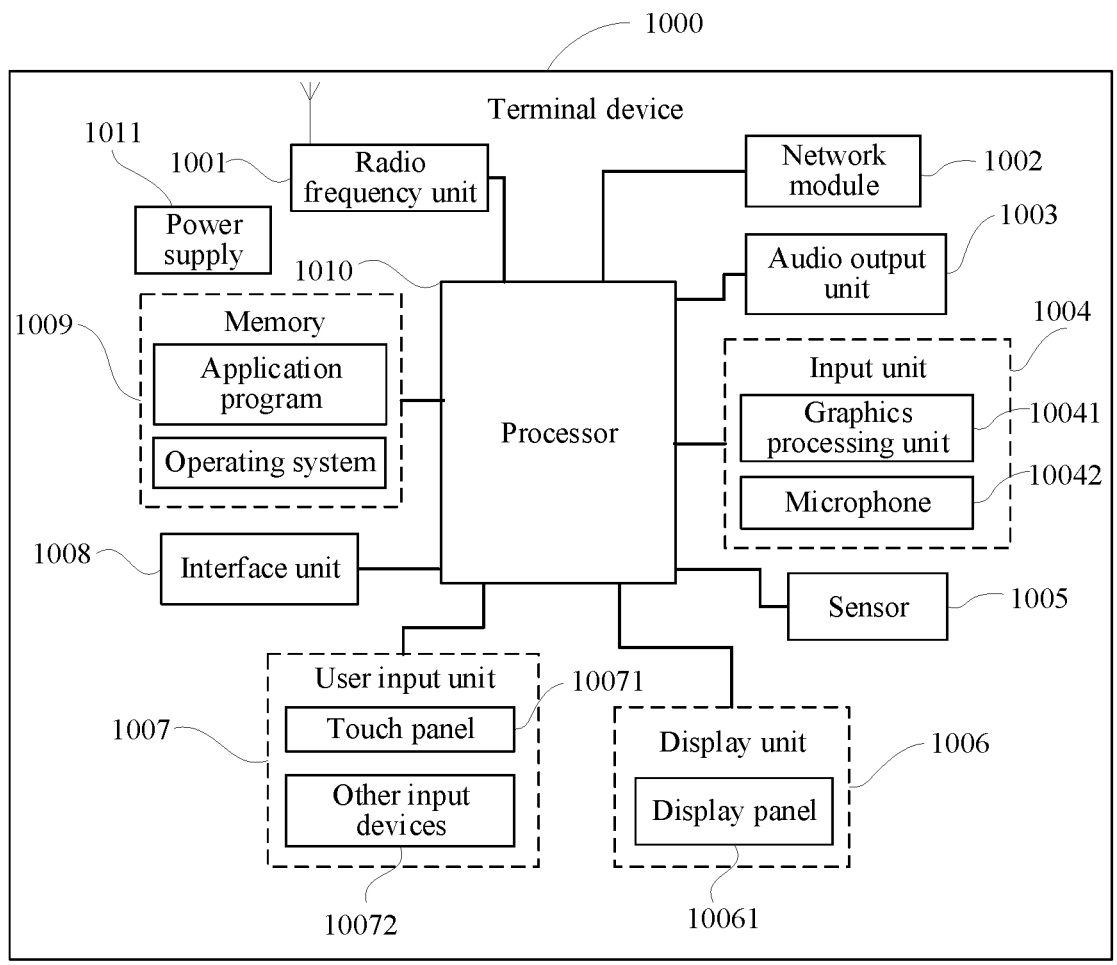
FIG. 10 is a structural diagram of another terminal device according to an embodiment of this disclosure.

FIG. 10 is a structural diagram of another terminal device according to an embodiment of this disclosure. Referring to FIG. 10, the terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the terminal device is not limited to the terminal device structure shown in FIG. 10. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The radio frequency unit 1001 is configured to receive uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

The processor 1010 is configured to perform uplink resource allocation based on the uplink resource allocation rule information.

In this embodiment of this disclosure, because the first uplink resource allocation rule and the second uplink resource allocation rule are resource allocation rules respectively configured for different states of a path, resources can be allocated flexibly for the path of the bearer of the terminal device by receiving the first uplink resource allocation rule and/or the second uplink resource allocation rule configured by the network-side device for the path of the bearer of the terminal device, and using an uplink resource allocation rule corresponding to a state of the path for uplink resource allocation, thereby improving the reliability of service data transmission.

Optionally, the bearer includes at least two paths.
The processor 1010 is further configured to:
allocate, by a media access control MAC entity of the terminal device based on uplink resource allocation rule information corresponding to a target path, an uplink resource for the target path, where
the target path is a path of the at least two paths which corresponds to the MAC entity.

Optionally, the processor 1010 is further configured to:
when the uplink resource allocation rule information includes the first uplink resource allocation rule and the second uplink resource allocation rule, allocate an uplink resource for the path by using the first uplink resource allocation rule when the path is in the activated state; and
allocate an uplink resource for the path by using the second uplink resource allocation rule when the path is in the deactivated state.

Optionally, the first uplink resource allocation rule includes at least one of the following:
type information of a first available uplink resource; and
type information of a first unavailable uplink resource;
and/or,
the second uplink resource allocation rule includes at least one of the following:
type information of a second available uplink resource; and
type information of a second unavailable uplink resource.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;
and/or,
the type information of the first available uplink resource and/or the type information of the second available uplink resource includes information used to indicate any uplink resource available;
and/or,
the type information of the first unavailable uplink resource and/or the type information of the second unavailable uplink resource includes information used to indicate any uplink resource unavailable.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

Optionally, the beam identifier and/or the transmission node identifier includes at least one of the following:

a synchronization signal block SSB identifier;

a channel state information reference signal CSI-RS identifier;

a reference signal identifier other than the CSI-RS identifier; and a port identifier corresponding to a reference signal.

Optionally, the control channel identifier corresponding to a beam and/or the control channel identifier corresponding to a transmission node includes at least one of the following:

a control channel type identifier;

a resource location identifier of a control channel;

a reference signal identifier of a control channel; and a port identifier corresponding to a reference signal of a control channel.

It should be understood that, in this embodiment of this disclosure, the radio frequency unit 1001 may be configured to send or receive a signal in an information sending/receiving or call process. Specifically, the radio frequency unit 1001 receives downlink data from a base station and sends the downlink data to the processor 1010 for processing; and sends uplink data to the base station. Usually, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device by using a wireless communications system.

The terminal device provides wireless broadband Internet access for a user by using the network module 1002, for example, helps the user send and receive e-mails, browse web pages, and access streaming media.

The audio output unit 1003 may convert audio data into an audio signal, and output the audio signal as sound, where the audio data is received by the radio frequency unit 1001 or the network module 1002, or stored in the memory 1009. In addition, the audio output unit 1003 may further provide audio output (for example, a call signal received sound or a message received sound) that is related to a specific function performed by the terminal device 1000. The audio output unit 1003 includes a speaker, a buzzer, a phone receiver, and the like.

The input unit 1004 is configured to receive an audio signal or a video signal. The input unit 1004 may include a graphics processing unit (GPU) 10041 and a microphone 10042, and the graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium), or may be sent by the radio frequency unit 1001 or the network module 1002. The microphone 10042 may receive a sound, and can process the sound into audio data. In a phone call mode, processed audio data may be converted, for output, into a format for transmission by the radio frequency unit 1001 to a mobile communications base station.

The terminal device 1000 further includes at least one sensor 1005, for example, an optical sensor, a motion sensor, and other sensors. Specifically, the optical sensor includes an ambient light sensor and a proximity sensor. The ambient light sensor may adjust brightness of a display panel 10061 based on intensity of ambient light. When the terminal device 1000 moves near an ear, the proximity sensor may disable the display panel 10061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 1005 may further include a fingerprint sensor, a pressure sensor, an iris sensor, a molecular sensor, a gyroscope, a barometer, a hygrometer, a thermometer, or an infrared sensor. Details are not described herein again.

The display unit 1006 is configured to display information entered by the user or information provided for the user. The display unit 1006 may include the display panel 10061, and the display panel 10061 may be configured in the form of a liquid crystal display (LCD), an organic light-emitting diode (OLED), or the like.

The user input unit 1007 may be configured to receive entered numerical or character information, and generate key signal input that is related to user setting and function control of the terminal device. Specifically, the user input unit 1007 includes a touch panel 10071 and other input devices 10072. The touch panel 10071 is also referred to as a touchscreen and can collect a touch operation (such as an operation performed by the user on the touch panel 10071 or near the touch panel 10071 with a finger or by using any proper object or accessory such as a stylus) of the user on or near the touch panel 10071. The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1010, and receives and executes a command sent by the processor 1010. In addition, the touch panel 10071 may be implemented in a plurality of types, for example, a resistive type, a capacitive type, an infrared type, and a surface acoustic wave. In addition to the touch panel 10071, the user input unit 1007 may further include the other input devices 10072. Specifically, the other input devices 10072 may include but are not limited to a physical keyboard, a function key (for example, a volume control key or a power on/off key), a track ball, a mouse, and a joystick. Details are not described herein again.

Further, the touch panel 10071 may cover the display panel 10061. After detecting a touch operation on or near the touch panel 10071, the touch panel 10071 transmits the touch operation to the processor 1010 to determine a type of a touch event. Then the processor 1010 provides corresponding visual output on the display panel 10061 based on the type of the touch event. In FIG. 10, the touch panel 10071 and the display panel 10061 serve as two separate components to implement input and output functions of the terminal device. However, in some embodiments, the touch panel 10071 and the display panel 10061 may be integrated to implement the input and output functions of the terminal device. This is not specifically limited herein.

The interface unit 1008 is an interface for connecting an external apparatus to the terminal device 1000. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 1008 may be configured to receive input (for example, data information and electric power) from the external apparatus, and transmit the received input to one or more elements in the terminal device 1000; or may be configured to transmit data between the terminal device 1000 and the external apparatus.

The memory 1009 may be configured to store software programs and various data. The memory 1009 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 1009 may include a high-speed random access memory, or may include a nonvolatile memory, for example, at least one magnetic disk storage device or a flash memory device, or another volatile solid-state storage device.

The processor 1010 is a control center of the terminal device, uses various interfaces and lines to connect all parts of the entire terminal device, and performs various functions and data processing of the terminal device by running or executing the software program and/or module stored in the memory 1009 and invoking data stored in the memory 1009, thereby performing overall monitoring on the terminal device. The processor 1010 may include one or more processing units. Optionally, the processor 1010 may integrate an application processor and a modem processor. The application processor mainly processes an operating system, a user interface, an application program, and the like. The modem processor mainly processes wireless communication. It can be understood that the modem processor may be alternatively not integrated in the processor 1010.

The terminal device 1000 may further include a power supply 1011 (for example, a battery) that supplies power to each component. Optionally, the power supply 1011 may be logically connected to the processor 1010 by using a power management system, so as to implement functions such as charging management, discharging management, and power consumption management by using the power management system.

In addition, the terminal device 1000 includes some functional modules that are not illustrated. Details are not described herein again.

Optionally, an embodiment of this disclosure further provides a terminal device, including: a processor 1010, a memory 1009, and a computer program that is stored in the memory 1009 and capable of running on the processor 1010. When the computer program is executed by the processor 1010, the processes of the foregoing embodiments of the resource allocation method are implemented, with the same technical effects achieved. To avoid repetition, details are not described herein again.

Figure 11:
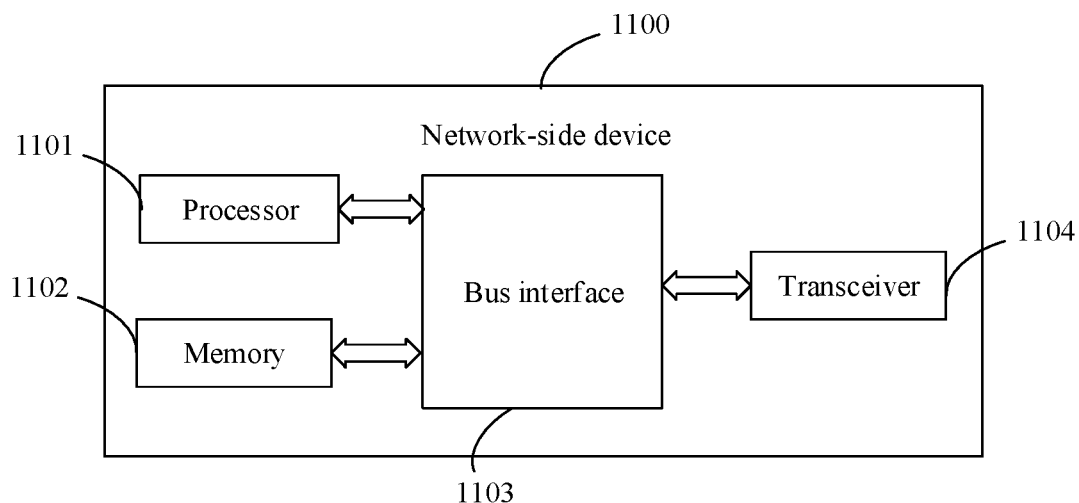
FIG. 11 is a structural diagram of another network-side device according to an embodiment of this disclosure.

FIG. 11 is a structural diagram of another network-side device according to an embodiment of this disclosure. As shown in FIG. 11, the network-side device 1100 includes: a processor 1101, a memory 1102, a bus interface 1103, and a transceiver 1104, where the processor 1101, the memory 1102, and the transceiver 1104 are all connected to the bus interface 1103.

In this embodiment of this disclosure, the network-side device 1100 further includes a computer program stored in the memory 1102 and capable of running on the processor 1101. When the computer program is executed by the processor 1101, the following step is implemented:

transmitting, to a terminal device, uplink resource allocation rule information configured for a path of a bearer of the terminal device, where the uplink resource allocation rule information includes a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state.

Optionally, the first uplink resource allocation rule includes at least one of the following:

type information of a first available uplink resource; and type information of a first unavailable uplink resource;

and/or, the second uplink resource allocation rule includes at least one of the following:

type information of a second available uplink resource; and type information of a second unavailable uplink resource.

Optionally, the type information of the uplink resource includes at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;

and/or, the type information of the first available uplink resource and/or the type information of the second available uplink resource includes information used to indicate any uplink resource available;

and/or, the type information of the first unavailable uplink resource and/or the type information of the second unavailable uplink resource includes information used to indicate any uplink resource unavailable.

Optionally, the beam information includes at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;

and/or, the transmission node information includes at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

Optionally, the beam identifier and/or the transmission node identifier includes at least one of the following:
- a synchronization signal block SSB identifier;
- a channel state information reference signal CSI-RS identifier;
- a reference signal identifier other than the CSI-RS identifier; and
- a port identifier corresponding to a reference signal.

Optionally, the control channel identifier corresponding to a beam and/or the control channel identifier corresponding to a transmission node includes at least one of the following:
- a control channel type identifier;
- a resource location identifier of a control channel;
- a reference signal identifier of a control channel; and
- a port identifier corresponding to a reference signal of a control channel.

An embodiment of this disclosure further provides a computer-readable storage medium, where the computer-readable storage medium stores a computer program. When the computer program is executed by a processor, the processes of the foregoing embodiments of the resource allocation method are implemented, with the same technical effects achieved. To avoid repetition, details are not described herein again. For example, the computer-readable storage medium is a read-only memory (ROM for short), a random access memory (RAM for short), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A resource allocation method, applied to a terminal device and comprising:
   receiving uplink resource allocation rule information configured for a path of a bearer of the terminal device, wherein the uplink resource allocation rule information comprises a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and
   performing uplink resource allocation based on the uplink resource allocation rule information.

2. The method according to claim 1, wherein the bearer comprises at least two paths; and the performing uplink resource allocation based on the uplink resource allocation rule information comprises:
   allocating, by a media access control MAC entity of the terminal device based on uplink resource allocation rule information corresponding to a target path, an uplink resource for the target path,
   wherein the target path is a path of the at least two paths which corresponds to the MAC entity.

3. The method according to claim 1, wherein when the uplink resource allocation rule information comprises the first uplink resource allocation rule and the second uplink resource allocation rule, the performing uplink resource allocation based on the uplink resource allocation rule information comprises:
   allocating an uplink resource for the path by using the first uplink resource allocation rule when the path is in the activated state; and
   allocating an uplink resource for the path by using the second uplink resource allocation rule when the path is in the deactivated state.

4. The method according to claim 1, wherein
   the first uplink resource allocation rule comprises at least one of the following:
   type information of a first available uplink resource; and
   type information of a first unavailable uplink resource; and/or,
   the second uplink resource allocation rule comprises at least one of the following:
   type information of a second available uplink resource; and
   type information of a second unavailable uplink resource.

5. The method according to claim 4, wherein
   the type information of the uplink resource comprises at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;
   and/or,
   the type information of the first available uplink resource and/or the type information of the second available uplink resource comprises information used to indicate any uplink resource available;
   and/or,
   the type information of the first unavailable uplink resource and/or the type information of the second unavailable uplink resource comprises information used to indicate any uplink resource unavailable.

6. The method according to claim 5, wherein the beam information comprises at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;
and/or,
the transmission node information comprises at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

7. The method according to claim 6, wherein the beam identifier and/or the transmission node identifier comprises at least one of the following:
a synchronization signal block SSB identifier;
a channel state information reference signal CSI-RS identifier;
a reference signal identifier other than the CSI-RS identifier; and
a port identifier corresponding to a reference signal.

8. The method according to claim 6, wherein the control channel identifier corresponding to a beam and/or the control channel identifier corresponding to a transmission node comprises at least one of the following:
a control channel type identifier;
a resource location identifier of a control channel;
a reference signal identifier of a control channel; and
a port identifier corresponding to a reference signal of a control channel.

9. A terminal device, comprising a processor, a memory, and a computer program stored in the memory and capable of running on the processor, wherein when the computer program is executed by the processor to implement the steps of:
receiving uplink resource allocation rule information configured for a path of a bearer of the terminal device, wherein the uplink resource allocation rule information comprises a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and
performing uplink resource allocation based on the uplink resource allocation rule information.

10. The terminal device according to claim 9, wherein the bearer comprises at least two paths; the computer program is executed by the processor to implement:
allocating, based on uplink resource allocation rule information corresponding to a target path, an uplink resource for the target path,
wherein the target path is a path of the at least two paths which corresponds to the MAC entity.

11. The terminal device according to claim 9, wherein when the uplink resource allocation rule information comprises the first uplink resource allocation rule and the second uplink resource allocation rule, the computer program is executed by the processor to implement:

allocating an uplink resource for the path by using the first uplink resource allocation rule when the path is in the activated state; and
allocating an uplink resource for the path by using the second uplink resource allocation rule when the path is in the deactivated state.

12. The terminal device according to claim 9, wherein the first uplink resource allocation rule comprises at least one of the following:
type information of a first available uplink resource; and
type information of a first unavailable uplink resource;
and/or,
the second uplink resource allocation rule comprises at least one of the following:
type information of a second available uplink resource; and
type information of a second unavailable uplink resource.

13. The terminal device according to claim 12, wherein the type information of the uplink resource comprises at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;
and/or,
the type information of the first available uplink resource and/or the type information of the second available uplink resource comprises information used to indicate any uplink resource available;
and/or,
the type information of the first unavailable uplink resource and/or the type information of the second unavailable uplink resource comprises information used to indicate any uplink resource unavailable.

14. The terminal device according to claim 13, wherein the beam information comprises at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;
and/or,
the transmission node information comprises at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

15. The terminal device according to claim 14, wherein the beam identifier and/or the transmission node identifier comprises at least one of the following:
a synchronization signal block SSB identifier;
a channel state information reference signal CSI-RS identifier;
a reference signal identifier other than the CSI-RS identifier; and
a port identifier corresponding to a reference signal.

16. The terminal device according to claim 14, wherein the control channel identifier corresponding to a beam and/or the control channel identifier corresponding to a transmission node comprises at least one of the following:
- a control channel type identifier;
- a resource location identifier of a control channel;
- a reference signal identifier of a control channel; and
- a port identifier corresponding to a reference signal of a control channel.

17. A computer-readable storage medium, wherein the computer-readable storage medium stores a computer program, and when the computer program is executed by a processor to implement the steps of:
   receiving uplink resource allocation rule information configured for a path of a bearer of the terminal device, wherein the uplink resource allocation rule information comprises a first uplink resource allocation rule and/or a second uplink resource allocation rule, the first uplink resource allocation rule is an uplink resource allocation rule used when the path is in an activated state, and the second uplink resource allocation rule is an uplink resource allocation rule used when the path is in a deactivated state; and
   performing uplink resource allocation based on the uplink resource allocation rule information.

18. The computer-readable storage medium according to claim 17, wherein
   the first uplink resource allocation rule comprises at least one of the following:
   type information of a first available uplink resource; and
   type information of a first unavailable uplink resource;
   and/or,
   the second uplink resource allocation rule comprises at least one of the following:
   type information of a second available uplink resource; and
   type information of a second unavailable uplink resource.

19. The computer-readable storage medium according to claim 18, wherein
   the type information of the uplink resource comprises at least one of the following: a sub-carrier spacing SCS corresponding to the uplink resource; a carrier corresponding to the uplink resource; a bandwidth part BWP corresponding to the uplink resource; beam information corresponding to the uplink resource; transmission node information corresponding to the uplink resource; duration of a transmission channel corresponding to the uplink resource; and grant type corresponding to the uplink resource;
   and/or,
   the type information of the first available uplink resource and/or the type information of the second available uplink resource comprises information used to indicate any uplink resource available;
   and/or,
   the type information of the first unavailable uplink resource and/or the type information of the second unavailable uplink resource comprises information used to indicate any uplink resource unavailable.

20. The computer-readable storage medium according to claim 19, wherein
   the beam information comprises at least one of the following: a beam identifier; a cell identifier corresponding to a beam; a frequency identifier corresponding to a beam; a BWP identifier corresponding to a beam; a control channel identifier corresponding to a beam; and a media access control MAC entity identifier corresponding to a beam;
   and/or,
   the transmission node information comprises at least one of the following: a transmission node identifier; a cell identifier corresponding to a transmission node; a frequency identifier corresponding to a transmission node; a BWP identifier corresponding to a transmission node; a control channel identifier corresponding to a transmission node; and a media access control MAC entity identifier corresponding to a transmission node.

* * * * *